United States Patent
McKenzie et al.

(10) Patent No.: US 7,843,145 B2
(45) Date of Patent: Nov. 30, 2010

(54) SYSTEM AND METHOD FOR POWER LINE CARRIER COMMUNICATION USING HIGH FREQUENCY TONE BURSTS

(75) Inventors: Philip McKenzie, Georgetown, TX (US); James Koehler, Pflugerville, TX (US)

(73) Assignee: Universal Lighting Technologies, Inc., Madison, AL (US)

( * ) Notice: Subject to any disclaimer, the term of this patent is extended or adjusted under 35 U.S.C. 154(b) by 420 days.

(21) Appl. No.: 11/945,870

(22) Filed: Nov. 27, 2007

(65) Prior Publication Data

US 2008/0278295 A1 Nov. 13, 2008

Related U.S. Application Data

(63) Continuation-in-part of application No. 11/332,853, filed on Jan. 13, 2006, now Pat. No. 7,394,204.

(51) Int. Cl.
H05B 37/02 (2006.01)
(52) U.S. Cl. .................... 315/291; 315/307; 340/825.2; 340/825.71
(58) Field of Classification Search ............... 340/825.2, 340/825.22, 825.25, 825.71, 310.12, 310.14; 315/292, 293, 291, 294, 295, 297, 299, 300, 315/307
See application file for complete search history.

(56) References Cited

U.S. PATENT DOCUMENTS

| | | | |
|---|---|---|---|
| 2,806,184 A | 9/1957 | Carter | |
| 3,488,517 A | 1/1970 | Cowen et al. | |
| 3,525,078 A | 8/1970 | Baggott | |
| 3,594,584 A | 7/1971 | Woods | |
| 3,689,886 A * | 9/1972 | Durkee | 340/825.26 |
| 3,714,451 A | 1/1973 | Whitney et al. | |
| 3,721,830 A | 3/1973 | Oishi et al. | |
| 3,818,466 A | 6/1974 | Honda | |
| 4,016,451 A | 4/1977 | Engel | |
| 4,205,360 A | 5/1980 | Drucker | |
| 4,230,971 A | 10/1980 | Gerhard et al. | |
| 4,254,403 A | 3/1981 | Perez-Cavero et al. | |
| 4,348,582 A | 9/1982 | Budek | |
| 4,398,178 A | 8/1983 | Russ et al. | |
| 4,400,688 A | 8/1983 | Johnston et al. | |
| 4,408,185 A | 10/1983 | Rasmussen | |
| 4,471,399 A | 9/1984 | Udren | |
| 4,523,128 A | 6/1985 | Stamm et al. | |
| 4,651,060 A | 3/1987 | Clark | |
| 4,680,508 A | 7/1987 | Rucki | |

(Continued)

FOREIGN PATENT DOCUMENTS

GB 408445 4/1934

(Continued)

*Primary Examiner*—David Hung Vu
(74) *Attorney, Agent, or Firm*—Waddey & Patterson, PC; Mark J. Patterson (57) ABSTRACT

A communication system and method is utilized to communicate data over an AC power line. Tone burst are superimposed on an AC power signal at predetermined voltage reference levels or at predetermined phase angles to represent bit values. These bit values are represented by either the presence or the absence of the tone burst on the AC power signal. In this manner, control information can be communicated to an apparatus, such as a ballast for a gas discharge lamp.

24 Claims, 7 Drawing Sheets

U.S. PATENT DOCUMENTS

| | | | |
|---|---|---|---|
| 4,704,563 A | 11/1987 | Hussey | |
| 4,996,513 A | 2/1991 | Mak et al. | |
| 5,005,187 A | 4/1991 | Thompson | |
| 5,043,635 A | 8/1991 | Talbott et al. | |
| 5,055,746 A | 10/1991 | Hu et al. | |
| 5,068,576 A | 11/1991 | Hu et al. | |
| 5,107,184 A | 4/1992 | Hu et al. | |
| 5,227,762 A | 7/1993 | Guidette et al. | |
| 5,264,823 A | 11/1993 | Stevens | |
| 5,471,119 A | 11/1995 | Ranganath et al. | |
| 5,475,360 A | 12/1995 | Guidette et al. | |
| 5,614,811 A | 3/1997 | Sagalovich et al. | |
| 5,691,605 A | 11/1997 | Xia et al. | |
| 5,691,691 A | 11/1997 | Merwin et al. | |
| 5,870,016 A | 2/1999 | Shrestha | |
| 5,872,429 A | 2/1999 | Xia et al. | |
| 6,225,759 B1 | 5/2001 | Bogdan et al. | |
| 6,388,399 B1 | 5/2002 | Eckel et al. | |
| 6,392,368 B1 | 5/2002 | Deller et al. | |
| 6,424,925 B1 | 7/2002 | Ku et al. | |
| 6,734,784 B1 | 5/2004 | Lester | |
| 6,784,790 B1 | 8/2004 | Lester | |
| 6,842,668 B2 | 1/2005 | Carson et al. | |
| 7,007,305 B2 | 2/2006 | Carson et al. | |
| 2004/0183463 A1 | 9/2004 | Sun et al. | |
| 2007/0131784 A1 | 6/2007 | Garozzo et al. | |

FOREIGN PATENT DOCUMENTS

| | | |
|---|---|---|
| JP | 53029541 | 3/1978 |
| JP | 53054447 | 5/1978 |
| JP | 4192727 | 7/1992 |
| JP | 5121988 | 5/1993 |
| WO | WO9960804 | 11/1999 |

\* cited by examiner

SYSTEM AND METHOD FOR POWER LINE CARRIER COMMUNICATION USING HIGH FREQUENCY TONE BURSTS

CROSS-REFERENCES TO RELATED APPLICATIONS

This application is a continuation-in-part application which claims benefit of co-pending U.S. patent application Ser. No. 11/332,853 filed Jan. 13, 2006, entitled "Zero Crossing Detection of Line Voltage/Current of Variable Amplitude" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems and methods for communicating data across a power distribution network. More particularly, this invention relates to a system and method for communicating data using an AC power signal to a device connected to the power line for energy management and/or control of the device.

Power line carrier (PLC) communication systems are frequently used to send data and control signals between devices connected to a power distribution network. Some conventional PLC systems communicate data by generating and then detecting disturbances in the 60 Hz AC signal that is used to deliver power to the load device. In many such prior art PLC systems, the signal disturbance is generated by using a PLC transmitter to periodically create a "short circuit" condition across the AC power line using a gated electronic switch, such as a triac. The short circuit condition is typically generated at or near a zero crossing of the AC signal. A receiver associated with the load device detects the disturbances (e.g., a "notch") in the AC signal and decodes various sequences or patterns of such disturbances as device control signals. When the transmitter in such prior art systems is in series with the AC power line and the load device, such systems can transmit data at only a 60 Hz data rate because the disturbance can only be introduced on the positive-to negative half-cycle of the AC power signal. Also, many of the gated switches used in these prior art systems cannot be turned off by their gate signal. Thus, if the switch is turned on just after a zero crossing, the AC line will be shorted through the switch. This may damage the switch and/or disable the power line by tripping an overcurrent device attached to the circuit. Also, conventional PLC systems using a gated switch configuration are less efficient and must use larger and more expensive components to handle the switching losses inherent with such systems.

What is needed, then, is a PLC communication system that is easy to use on existing power distribution networks, is energy efficient, and that is smaller in size and lower in cost as compared to conventional gated switch "notch" systems.

BRIEF SUMMARY OF THE INVENTION

To reduce the costs and the size of a PLC communication system over an AC power line, the system and method of the present invention superimposes a tone burst into the AC power signal rather than a notch. A tone generator circuit, for example an oscillator, is connected to the AC power line to introduce this tone burst into the power signal. The presence of a tone burst on the AC power signal can indicate that a first bit value is being transmitted, such as a one. The absence of a tone burst on the AC power signal can indicate a second bit value is being transmitted, such as a zero.

At the receiving device, a tone detection circuit is utilized to detect the presence of the tone burst on an AC power signal. The presence or absence of the tone burst can be decoded as a data packet of information. In a preferred embodiment, the tone burst is synchronized on the AC power signal at a particular reference voltage or at a predetermined phase angle. This reference voltage or phase angle may correspond to the zero crossing of the AC power signal.

To detect the tone bursts, the tone detector circuit has a filter circuit for filtering the tone burst out of the AC power signal. A tone burst detector circuit is then connected to the filter circuit to generate an indicator signal when the tone burst is present on the AC power signal. This indicator signal is transmitted to a pulse generating circuit that transmits pulses. When an indicator signal is present, the length of the pulse is modified so that a device receiving the pulses can discriminate whether a first bit value or a second bit value has been transmitted on the AC power signal.

In one embodiment of the invention, the PLC system is used to send control signals, such as lamp dimming signals, to an electronic ballast that is connected to a gas discharge lamp.

Accordingly, one of the objects of the present invention is to reduce the size and cost of the components in a PLC communication system utilizing an AC power line to communicate information.

Another object of the present invention is to utilize a tone burst instead of a notch superimposed on the AC power signal to communicate information to a device connected to the AC power line.

Yet another object of the present invention is to communicate information over an AC power line without creating a short circuit condition on the AC power line.

Still another object of the present invention is to create a system that is less likely to interfere with existing power line carrier systems.

DETAILED DESCRIPTION OF THE INVENTION

Figure 1:
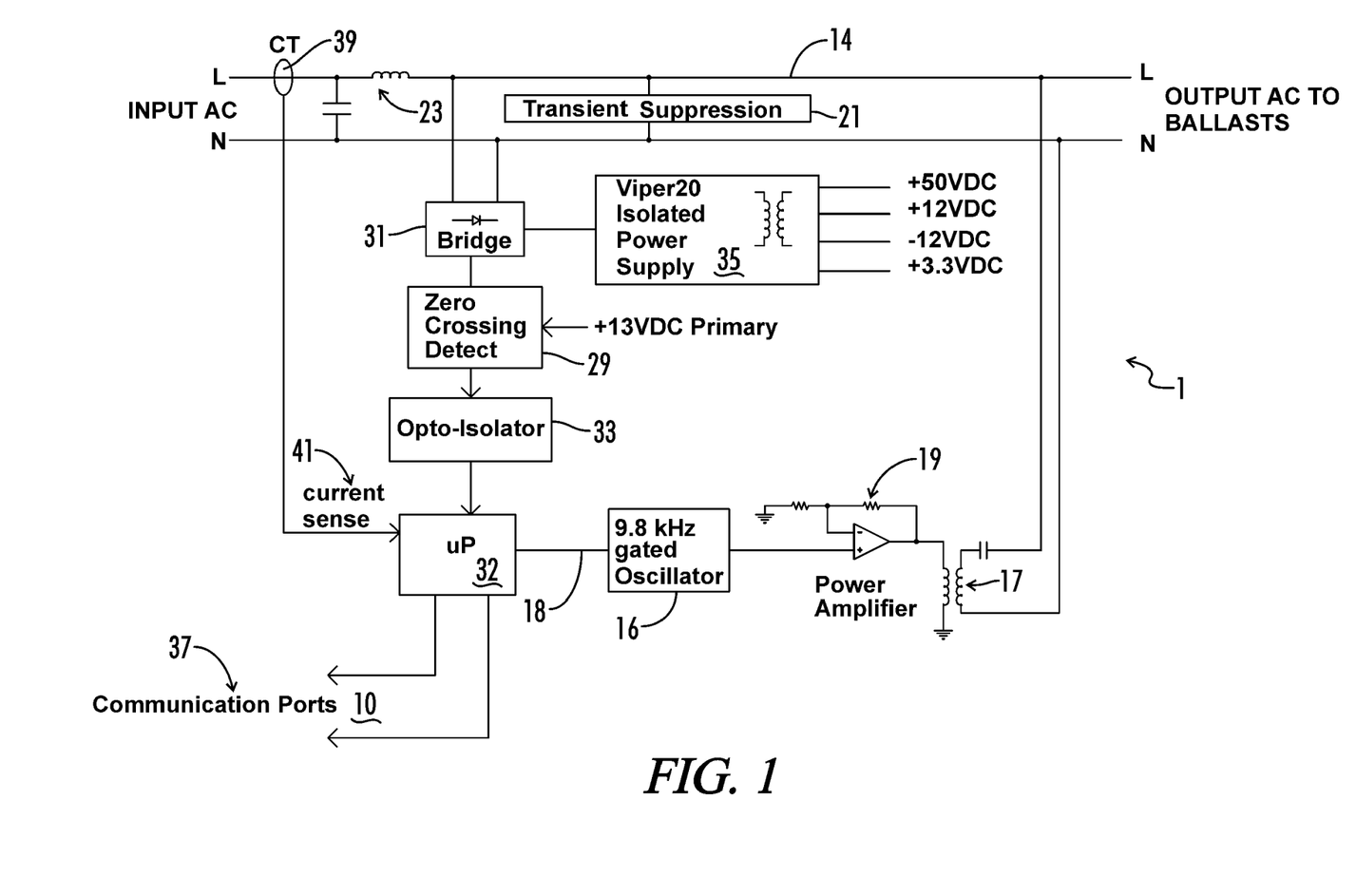
FIG. 1 is a block diagram of one embodiment of a system for communicating data on an AC power signal.
Figure 2:
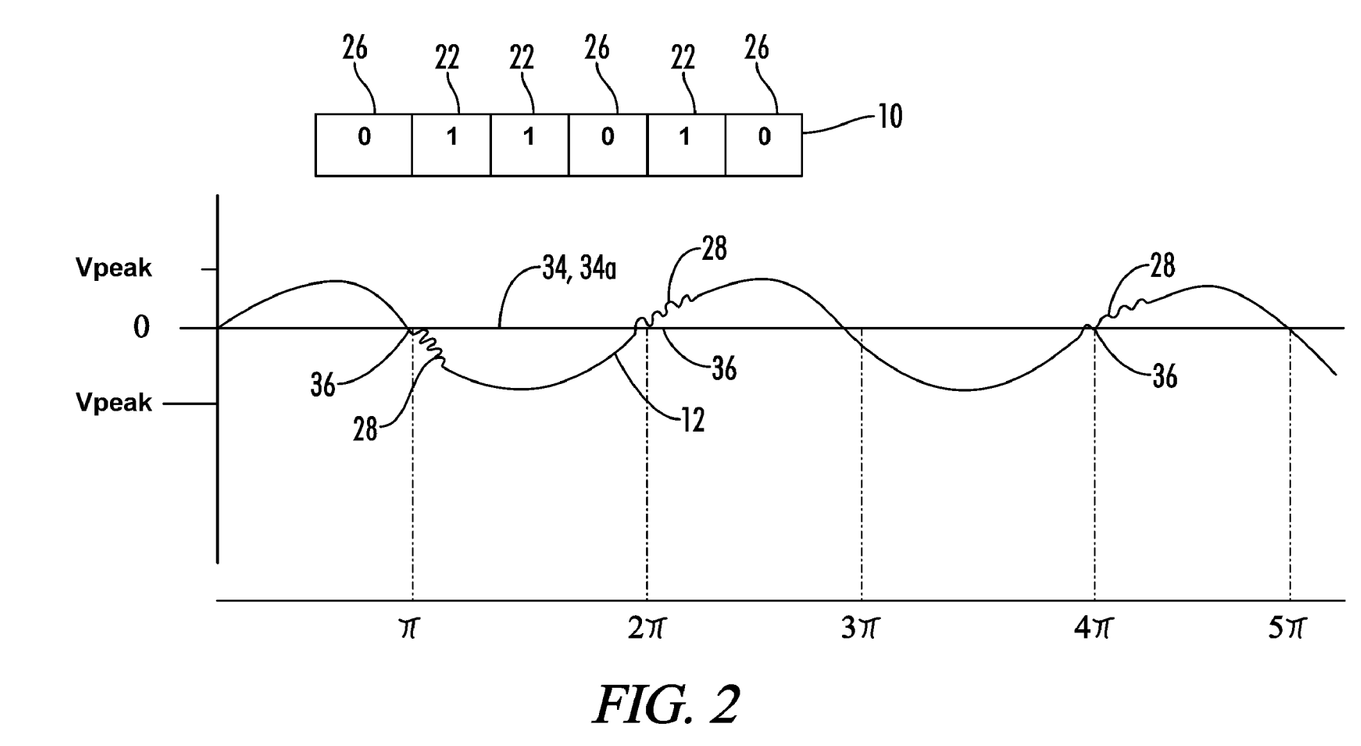
FIG. 2 is a graphic representation of a packet or stream of data bits and tone bursts superimposed on an AC power signal that correspond to the data bit values being transmitted to a receiving device.

Referring now to FIGS. 1 and 2, a Power Line Carrier (PLC) communication system 1 that communicates data 10 on an AC power signal 12 transmitted along an AC power line 14 is shown. In order to communicate data 10 over the AC power line 14, the communication system 1 periodically injects high frequency tone bursts 28 on the AC power signal 12. As shown in FIG. 2, these tone bursts 28 are injected at predetermined phase angle locations along the periodic cycle of the AC power signal 12. As will be explained in more detail below, the presence or absence of these tone bursts 28 at these predetermined locations along the periodic cycle of the AC power signal 12 are utilized to determine the data bit values being transmitted along the AC power line 14. There may be a single predetermined location along the periodic cycle of the AC power signal 12 that is relevant to data transmission and detection or there may be several. In a preferred embodiment, there are two relevant predetermined locations along the cycle of the AC power signal 12: the positive-to-negative zero crossings and the negative-to-positive zero crossing for the AC power signal. A device connected to the AC power line 14 will look to these relevant predetermined locations to detect and decode the data 10 transmitted on the AC power signal 12 at a data bit rate of 120 Hz.

As shown in FIG. 1, a tone generator (gated oscillator) circuit 16 is connected to the AC power line 14 to generate the tone bursts 28. The tone generator circuit 16 is preferably electrically coupled to the AC power line 14 via coupled inductive components 17, such as a transformer. This arrangement helps to filter out noise and other electromagnetic interference to the AC power line 14. A power amplifier 19 can be used to amplify the tone burst signals 28 before they are coupled to the AC power line 14. The inductive components 17 are preferably connected across the line (L) and neutral (N) legs of the AC power line 14.

Preferably, the AC power line 14 will include a conventional transient suppression circuit 21 and a low pass filter 23 to prevent high frequency signals from being transmitted upstream to the AC power grid.

As shown in FIG. 2, the tone generator circuit 16 creates a tone burst 28 that is injected on the AC power signal 12. The presence or absence of a tone burst 28 on the AC power signal 12 indicates to a receiving device whether a first bit value 22 or a second bit value 26 is being transmitted. In this example, the first bit value 22 is the bit value of a one and corresponds to a tone burst 28 being present on the AC power signal 12. The second bit value 26 is a zero and corresponds to the absence of a tone burst on the AC power signal 12.

The tone bursts 28 ordinarily are generated to have significantly higher frequency and lower amplitude compared to the AC power signal 12. In a preferred embodiment, the tone burst has a frequency of 9.8 kHz. Using a 9.8 kHz tone burst has several advantages. First, a tone burst at this frequency reduces cross-talk to adjacent tandem power circuits with common neutrals. Second, when this system is utilized with gas discharge lamp ballast, a 9.8 kHz signal is below the self-resonant frequency of a typical EMI filter for the ballast. Also, a 9.8 kHz tone burst is more compatible with conventional power line carrier system hardware.

Figure 3:
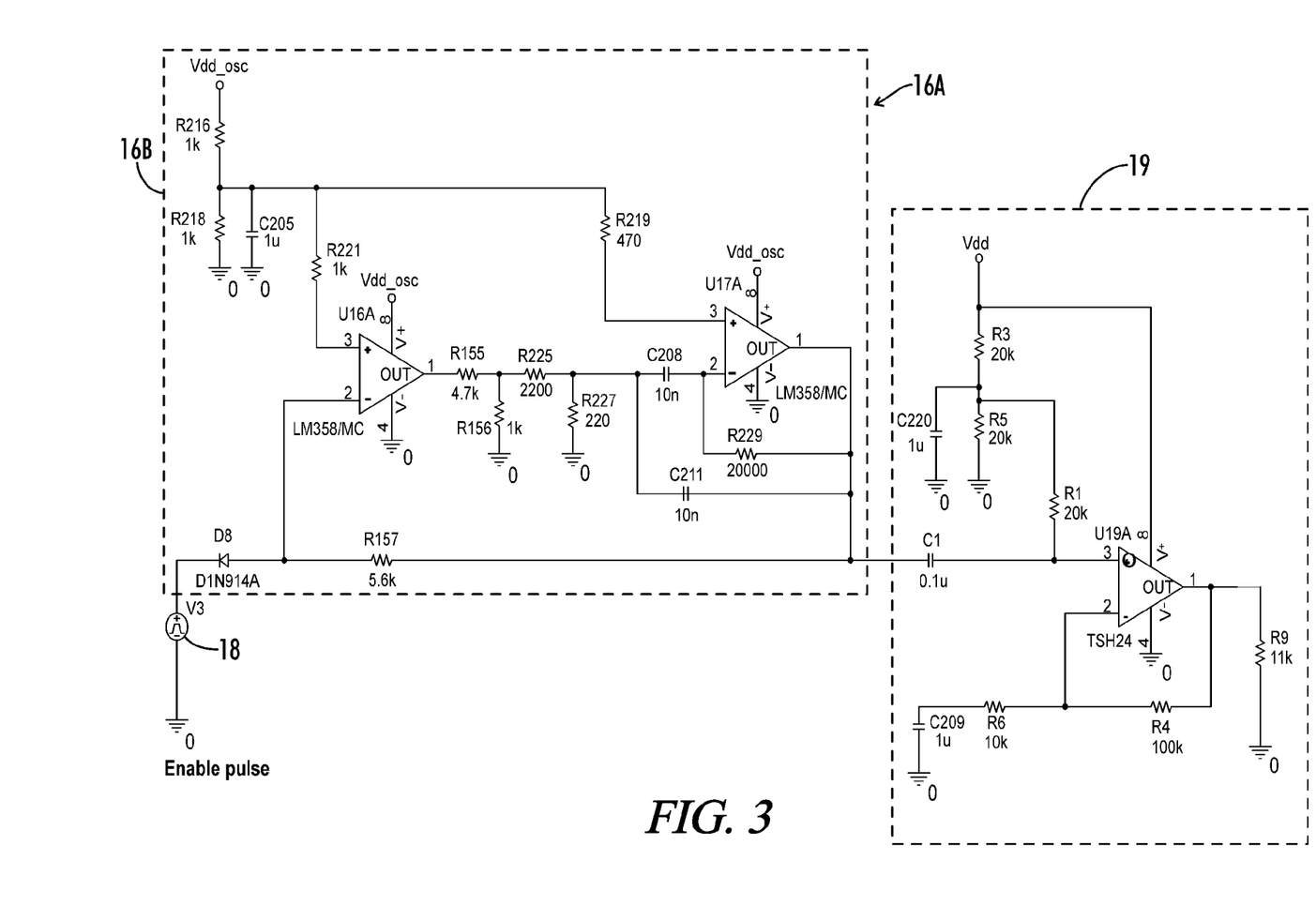
FIG. 3 is a schematic diagram of one embodiment of a tone generator circuit utilized to create tone bursts on the AC power signal in accordance with the present invention.
Figure 6:
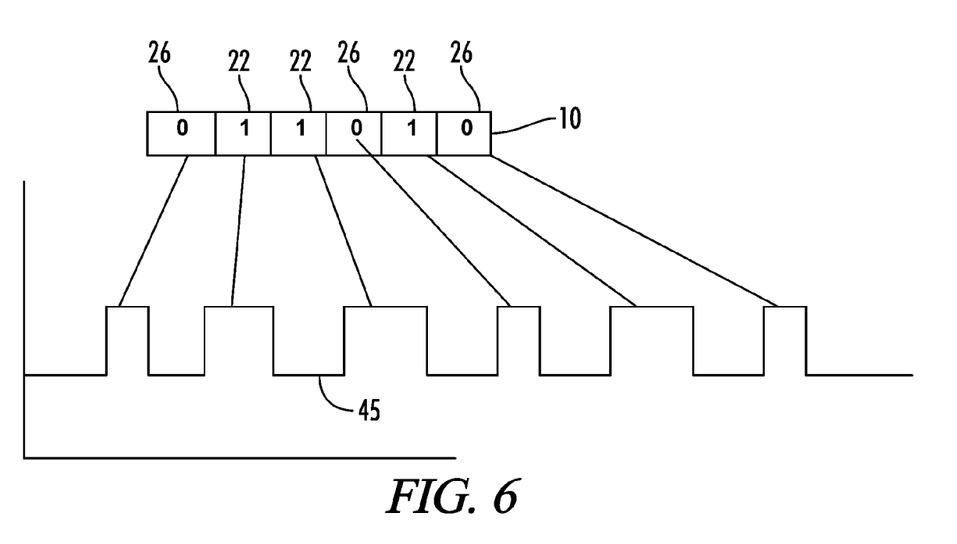
FIG. 6 is a graphical representation of data detection pulses created in accordance with one aspect of the invention, the graph showing that the length of the pulses is dependent on the data bit values being transmitted by the system.

Referring to FIG. 3, a gated tone generator circuit 16A is shown. The tone generator circuit 16A is designed to work with (be enabled by) a pulsed drive signal 18 (FIG. 6). The tone generator circuit 16A receives the drive (enable) pulse signal 18 from drive circuit 32 (FIG. 1). This causes the Butterworth filter oscillator circuit 16B to generate a tone burst which is subsequently amplified by power amplifier circuit 19. The tone burst 28 is then coupled to the AC power line 14 and superimposed on the AC power signal 12. Preferably, the pulsed drive signal 18 is synchronized to generate tone bursts only at the predetermined locations along the cycle of the AC power signal. This can be done by using a conventional zero crossing detector circuit 29 (FIG. 1) that is electrically coupled to the AC power line and to the drive circuit 32 to provide the synchronization function. One example of a conventional zero crossing detector circuit that can be used is shown in FIG. 4(b) and described with reference to the system detector circuit. In a preferred embodiment as shown on FIG. 1, the zero crossing detector 29 is coupled to the AC power line 14 through a conventional full-wave bridge rectifier circuit 31, and to the drive circuit 32 through an opto-isolator circuit 33. An isolated power supply 35 is also coupled to the bridge rectifier circuit 31 to provide operating power to the system components.

Also as shown on FIG. 1, the drive circuit 32 can be a microprocessor having communication ports 37 to receive data 10 from an external source. For example, the communication ports 37 can be coupled to a remote dimming control circuit (not shown) to receive dimming commands for lamp loads connected downstream on the AC power line 14. The drive circuit 32 can further have a current sense input 41 coupled to a current transformer 39 coupled to the AC power line. The current sense input 41 can be used for sensing the AC power line signal such as for synchronizing operation of the system to certain phase angles or other parameters of the waveform.

Referring again to FIGS. 2 and 7, the drive signal 18 is in a first state or form 20 when a first bit value 22 is being transmitted and is in a second state or form 24 when a second bit value 26 is being transmitted. In this example, the first state 20 is a pulse 20A and the second state 24A is the absence of a pulse. By sending the first state 20 to the tone generator circuit 16, the tone generator circuit 16 is enabled or excited, thereby causing a tone burst 28 to be injected on the AC power signal 12. However, it should be understood that the form of the drive signal 18 is not limited to a pulse. Any form can be utilized so long as this form can be translated by a tone generation circuit into a tone burst 28.

As shown in the graph of FIG. 2, the tone burst 28 is superimposed on the AC power signal 12 when a first bit value 22, which in this case equals a one, is being transmitted on the AC power signal 12. The tone bursts 28 are injected on the AC power signal 12 at certain predetermined phase locations. To accomplish this, the drive signal 18 may be synchronized to activate the tone generator circuit 16 when the AC power signal 12 approaches or is equal to a reference voltage 34. In a preferred embodiment, the reference voltage is a zero crossing 34A of the AC power signal 12. However, the drive signal 18 may be synchronized to activate the tone generator circuit 16 at any contemplated reference voltage or set of reference voltages. These zero crossings 34A and crossings at other desired reference voltages 34 will occur at predetermined phase angles 36 on the AC power signal 12. Thus, any circuit attempting to extract information from the AC power signal may look to these reference voltages 34, 34A or to these predetermined phase angles 36 to determine what bit value is being transmitted.

For example, as shown in FIG. 2, when a data "zero" is being transmitted, no tone burst 28 will be present on the AC power signal 12 at the reference voltage 34 or at a predetermined phase angle 36. However, when a "one" is being transmitted, a tone burst 28 is superimposed on the AC power signal 12.

Figure 7:
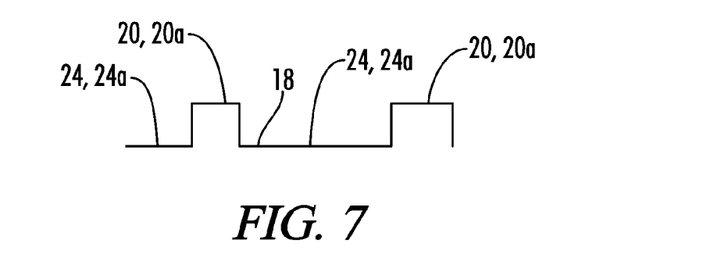
FIG. 7 is a graphical representation of the pulsed drive signal used by the system of the present invention to generate tone bursts.

Normally, a drive circuit 32 is coupled to the tone generator circuit 16 to generate the drive signal 18 for activating the tone generator circuit 16. In the embodiment shown in FIG. 1, the drive circuit 32 is configured to generate pulses 20A. The drive circuit 32 may be a hardware device that receives the data 10 and encodes the data 10 into pulses 20A (FIG. 7). However, the drive circuit 32 may also be a microprocessor which is programmed to receive the data 10 and encode the data into pulses 20A.

Figure 4A:
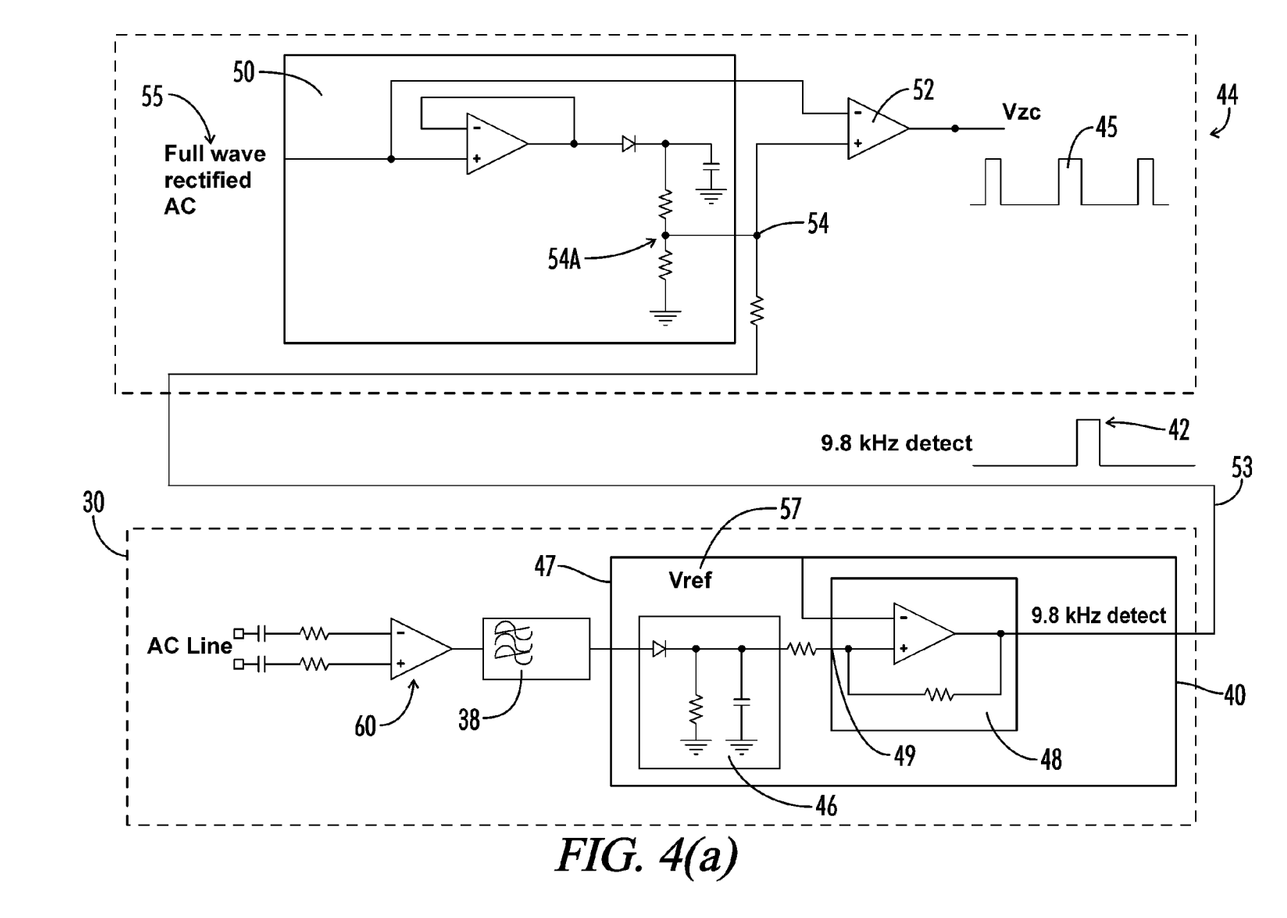
FIG. 4(a) is a schematic diagram of one embodiment of a tone detector circuit utilized to detect tone bursts on an AC power signal in accordance with the present invention.
Figure 4B:
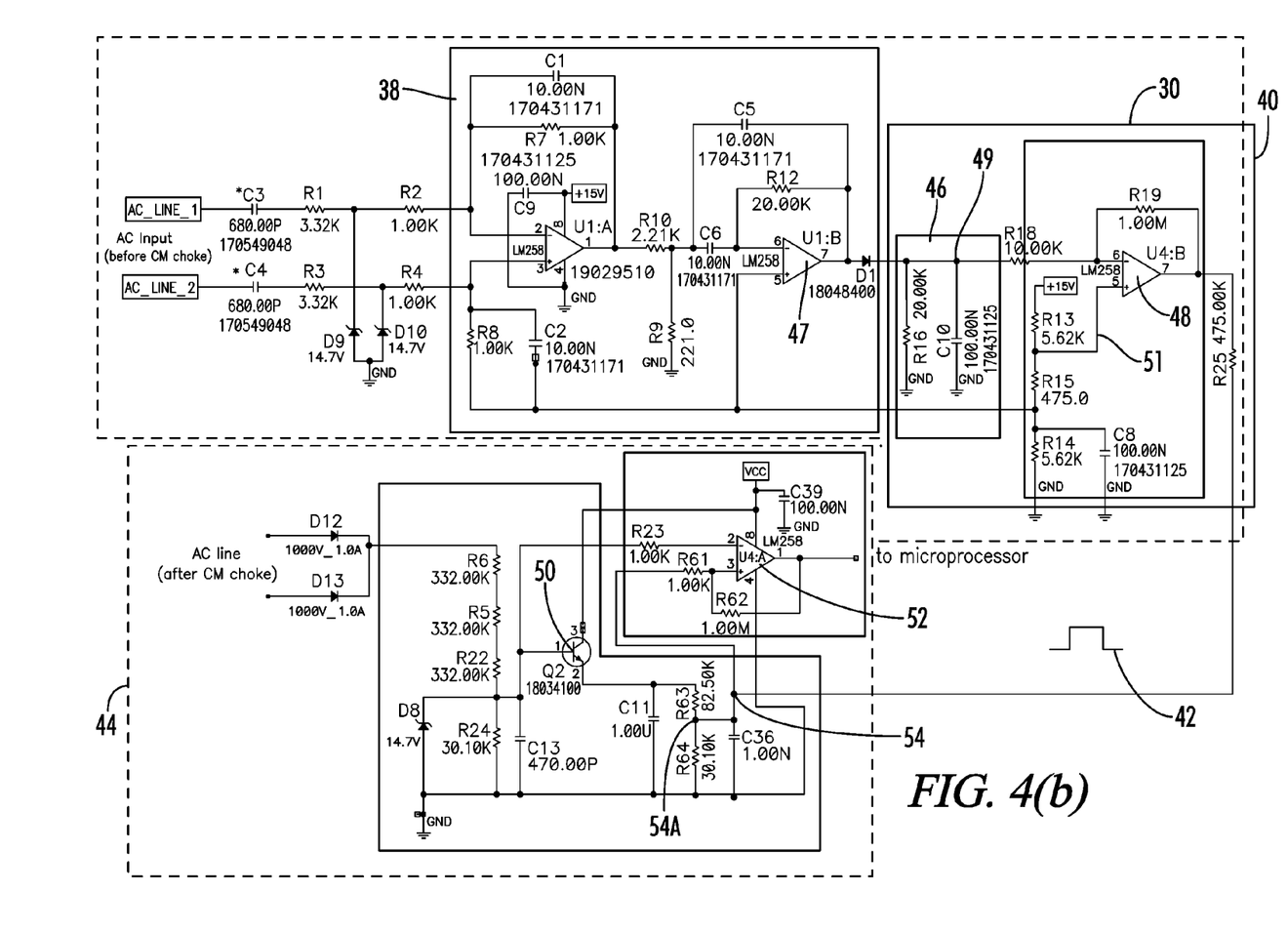
FIG. 4(b) is a schematic diagram of another embodiment of a tone detector circuit utilized to detect tone bursts on an AC power signal in accordance with the present invention.
Figure 5:
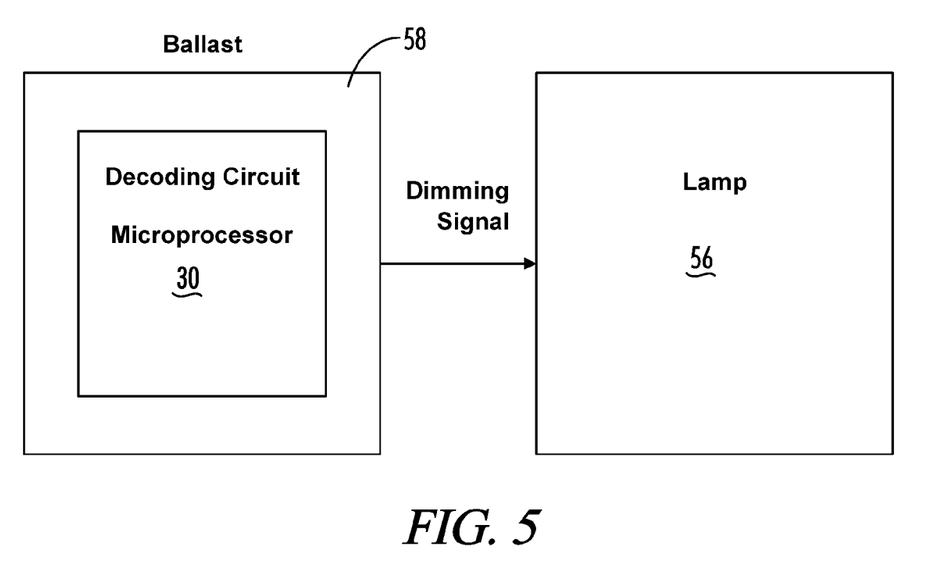
FIG. 5 is a block diagram of an electronic ballast and gas discharge lamp coupled to an AC power line to utilize the system and method of the present invention to dim the lamp.

As shown in FIGS. 4(a), 4(b) and 5, the communication system 1 can include a decoder circuit 30 associated with a receiving device. In the embodiment of FIG. 5, the receiving device is an electronic ballast 58 that powers a gas discharge lamp 56. The decoder circuit 30 detects the presence or absence of the tone bursts 28 to determine which bit value 22, 26 is being transmitted. In FIGS. 4(a) and 4(b), two different embodiments of a decoder circuit are shown. The decoder circuit of FIG. 4(a) shows some of the basic components for implementing one embodiment of the invention. The decoder circuit of FIG. 4(b) is a preferred embodiment.

To determine which bit value 22 or 26 is being transmitted, the decoder circuits in FIGS. 4(a) and 4(b) include a filter circuit 38 for receiving and isolating tone bursts 28 from the AC power signal 12. FIG. 4(b) shows the filter circuit 38 as an op-amp band pass filter to extract the tone bursts 28. In a preferred embodiment, the filter 38 has a center frequency of approximately 9.8 kHz. Preferably, the filter circuit 38 is coupled to the AC line 14 through a buffer stage 60. (FIG. 4(a))

A tone detection circuit 40 is connected to the filter circuit 38. The detection circuit 40 generates an indicator signal 42 that indicates that a tone burst 28 is present on the AC power signal 12. In a preferred embodiment, the tone detection circuit 40 includes a peak detector circuit 46 connected to an output 47 of the filter circuit 38. The peak detector circuit 46 that conventionally operates to sense a peak output voltage from the filter circuit 38. If no tone burst 28 is present on the AC power signal 12, the voltage at the output of peak detector circuit 46 will be low. However, if a tone burst 28 is present on the AC power signal 12, then the peak detector circuit 46 will store the peak voltage of the tone burst 28. A comparator circuit 48 receives the output 49 from the peak detector circuit 46 and compares it to a reference voltage 51.

The comparator circuit 48 will output an indicator signal 42 at the comparator output 53 if the peak output voltage 49 is greater than or equal to the reference voltage 51. The reference voltage 51 is selected so that when a tone burst 28 is present, the output 49 from the peak detector circuit 46 is greater than the reference voltage 51. In this situation, the comparator circuit 48 will produce the indicator signal 42. If the peak output voltage 49 is lower than the reference voltage 51, no indicator signal 42 will be transmitted.

The indicator signal 42 is coupled to a pulse generator circuit 44 that generates pulses 45. As shown in FIG. 6, the pulse generator circuit 44 modifies the length of one of the pulses 45 when the indicator signal 42 indicates that a tone burst 28 is present. Thus, in the example shown in FIG. 6, when a zero is being transmitted, the pulse generating circuit 44 has a normal length pulse. However, when a one is being transmitted, a longer pulse 45 is transmitted.

The pulses 45 are coupled to a receiving device so that the device can utilize the information to perform a particular function. The receiving device can include a microprocessor that interprets a sequence of ones and zeros as load control commands.

In a preferred embodiment, the pulse generator circuit 44 receives the AC power signal 12 in a rectified form. However, the pulse generator circuit may receive any type of signal associated with the AC power signal 12 including the AC power signal 12 itself. However, a full-wave rectified AC input signal 55 allows the pulse generator circuit 44 to generate pulses on or near both the positive-to-negative and negative-to-positive zero crossings of the AC power signal 12.

As shown in FIGS. 4(a) and 4(b), the pulse generator circuit 44 includes a peak detector circuit 50. The peak detector circuit 50 receives the AC input signal 55 and produces an input signal reference voltage 54 proportional to a peak voltage for the AC input signal 55. Thus, the peak detector circuit 50 measures the peak voltage of the AC input signal 55 and then uses a voltage divider 54A to produce the input signal reference voltage 54. In a preferred embodiment, the input signal reference voltage 54 is relatively close to the zero crossing of the AC input signal 55. A comparator circuit 52 then receives and compares the input signal reference voltage 54 and the AC input signal 55. The comparator circuit 52 outputs a pulse 45 when the AC input signal 55 is less than the input signal reference voltage 54. When the input signal 55 is again exceeds the input signal reference voltage 54, the transmission of the pulse 45 stops.

The comparator circuit 52 also receives the indicator signal 42. When the indicator signal 42 is received by the comparator circuit 52, the input signal reference voltage 54 is increased. Accordingly, the magnitude of AC input signal 55 will spend a longer amount of time below the magnitude of the input signal reference voltage 54. This lengthens one of the pulses 45. Thus, when a tone burst 28 is detected on the AC power signal 12, a longer pulse 45 will be generated.

As shown in FIG. 6, the data 10 is represented by the length of the pulses 45. A data "zero" corresponds to a normal pulse while a data "one" is represented by a longer pulse. However, it should be understood that the presence of the indicator signal 42 could be utilized to lower the reference voltage 54, thereby shortening the length of the normal pulse, if the circuit that receives this information knows that a shorter pulse represents a change in the pulse length value.

As shown in FIG. 5, the pulses 45 can be sent to control a device connected to the AC power line 14 such as a gas discharge lamp 56A. Lamp 56A is powered by an electronic ballast 58 which can control the dimming of the lamp 56. To send dimming control signals to the ballast 58, the AC power line 14 is often utilized. The ballast 58 will incorporate a decoder circuit 30 which can be a microprocessor. This microprocessor receives the series of pulses 45 and is programmed to decode the pulses to extract the transmitted data packet 10. In this manner, the desired dimming level of the lamp 56 can be controlled utilizing the power line 14.

For example, the desired dim level may be encoded by transmitting a repeating pattern of evenly distributed ones and zeros, where the ratio of ones to zeros is proportional to the desired lamp brightness. Because the ones and zeros are evenly distributed, the decoding can start anywhere in the data pattern. The dimming level is decoded by counting the number of ones or zeros within a group of bits equaling the denominator. The even pattern distribution causes any successive group of bits to yield the same result.

Thus, although there have been described particular embodiments of the present invention of a new and useful

What is claimed is:

1. A method of communicating data on an AC power line carrying an AC power signal comprising:
   (a) in accordance with the data to be communicated, periodically injecting a high frequency signal on the AC power line so that high frequency tone bursts are superimposed on the AC power signal;
   (b) detecting the presence and absence of the tone bursts on the AC power line signal;
   (e) decoding the detected presence and absence of the tone bursts to extract the data;
   wherein the data communicated across the power line is represented by a sequence of first and second bit values; and
   wherein the step of decoding the detected presence and absence of the tone bursts to extract the data further comprises
      determining if a tone burst is present on the AC power signal,
      generating an indicator signal if the tone burst is present on the AC power signal,
      transmitting the indicator signal to a pulse generation circuit that generates electrical pulses, and
      modifying the electrical pulses when the indicator signal is received by the pulse generation circuit so that a modified pulse corresponds to the first bit value and an unmodified pulse corresponds to the second bit value.

2. The method of claim 1 wherein the step of determining if a tone burst is present on the AC power signal comprises:
   filtering the AC power signal to extract tone bursts from the AC power signal;
   determining a peak voltage value of the filtered AC power signal; and
   comparing the peak voltage value with a reference voltage, the peak voltage value being greater than the reference voltage when the tone burst is present and being lower than the reference voltage when the tone burst is absent.

3. The method of claim 1, wherein the pulse generation circuit generates each of the pulses at a predetermined phase angle of the AC power signal.

4. The method of claim 1, wherein the pulse generation circuit comprises:
   a peak detector circuit receiving an AC input signal responsive to the AC power signal, the peak detector circuit having an output proportional to a peak voltage value of the AC input signal wherein the output of the peak detector circuit is increased if the indicator signal is present;
   a comparator that receives the AC input signal and the output of the peak detector circuit, and the indicator signal when a tone burst is present on the AC power signal, the comparator producing one of the pulses so long as the AC input signal is lower than the output of the peak detector circuit.

5. The method of claim 4, further comprising rectifying the AC power signal to create the AC input signal.

6. A system for communicating data on an AC power signal, comprising:
   an AC power line for transmitting the AC power signal;
   a tone generator circuit electrically coupled to the AC power line, the tone generator circuit generating high frequency tone bursts that are superimposed on the AC power signal in patterns corresponding to first and second bit values associated with the data to be communicated;
   a tone detection circuit comprising a pulse generation circuit that generates electrical pulses in response to an indicator signal; and
   the tone generation circuit is functional to
      detect the presence or absence of the tone bursts on the AC power signal,
      generate the indicator signal if the tone burst is present on the AC power signal,
      transmit the indicator signal to the pulse generation circuit, and
      modify the electrical pulses when the indicator signal is received by the pulse generation circuit so that a modified pulse corresponds to the first bit value and an unmodified pulse corresponds to the second bit value.

7. The system of claim 6 further comprising a drive circuit electrically coupled to the tone generator circuit, the drive circuit producing a drive signal that causes the tone generator circuit to generate the tone bursts in accordance with the data to be communicated.

8. The system the claim 7, wherein the drive signal is synchronized such that it causes the tone generator circuit to generate the tone burst when the AC power signal approaches or is equal to a reference voltage.

9. The circuit of the claim 7, wherein the drive signal is synchronized such that it causes the tone generator circuit to generate the tone bursts when the AC power signal approaches or is equal to a predetermined phase angle.

10. The circuit of the claim 7, wherein the drive signal is synchronized such that is it causes the tone generator circuit to generate the tone bursts when the AC power signal approaches or is equal to a zero crossing.

11. A method of determining data bit values being communicated on an AC power signal that is transmitted along an AC power line, the method comprising:
   (a) determining if a tone burst is present on the AC power signal;
   (b) generating an indicator signal if the tone burst is present on the AC power signal;
   (c) transmitting the indicator signal to a pulse generation circuit that generates pulses; and
   (d) modifying the pulses if the indicator signal is present whereby an unmodified pulse corresponds to a first bit value and a modified pulse corresponds to a second bit value.

12. The method of claim 11 wherein step (a) comprises:
   filtering the AC power signal to extract the tone burst if present on the AC power signal; and
   determining a peak value of the filtered AC power signal.

13. The method of claim 12 wherein step (b) further comprises:
   comparing the peak value of the AC power signal with a reference voltage; and
   generating the indicator signal if the peak value is equal to or greater than the reference voltage.

14. The method of the claim 11, wherein step (d) further comprises:
   rectifying the AC power signal to produce a rectified AC input signal;
   detecting a peak value of the rectified AC input signal;
   comparing a threshold value with a reference value, the threshold value being proportional to the peak value of the AC input signal;
   increasing the threshold value if an indicator signal is present; and producing a pulse when the AC input signal is equal to or less than the threshold signal.

15. A device for detecting tone bursts superimposed on an AC power signal, the tone bursts corresponding to lamp control signals being communicated across an AC power line to a ballast powering a gas discharge lamp, comprising:
 a filter circuit coupled to the AC power line to filter the tone bursts out of the AC power signal;
 a detector circuit connected to an output of the filter circuit, the detector circuit generating an indicator signal indicating the presence of the tone bursts on the AC power signal; and
 a pulse generating circuit that transmits pulses, the pulse generation circuit coupled to receive the indicator signal from the detector circuit and functional to modify a length of one of the pulses when the indicator signal indicates the presence of one of the tone bursts.

16. The device of claim 15, wherein the detector circuit further comprises:
 a peak detector circuit connected to an output of the filter circuit, the peak detector circuit functional to sense a peak output voltage from the filter circuit; and
 a comparator circuit receiving an output from the peak detector circuit and comparing the output from the peak detector circuit with a reference voltage, the comparator circuit having a comparator output that transmits the indicator signal if the peak output voltage is greater than or equal to the reference voltage.

17. The device of claim 15, wherein the pulse generating circuit further comprises:
 a peak detector circuit receiving an AC input signal associated with the AC power signal, the peak detection circuit producing an input signal reference voltage proportional to a peak voltage of the AC input signal; and
 a comparator circuit that receives the input signal reference voltage, the indicator signal, and the AC input signal, the comparator circuit comparing the AC input signal with the input signal reference voltage wherein one of the pulses is transmitted so long as the AC input signal is equal to or less than the input reference voltage, wherein the presence of the indicator signal increases the input signal reference voltage thereby lengthening the transmission of one of the pulses.

18. The device of claim 15 wherein the ballast dims the lamp according to a dimming control signal defined by the pulses.

19. The device of claim 15 wherein the lamp control signals are defined by a pattern of bit values and the device further comprises a decoding circuit that determines the bit values according to the length of the pulses.

20. The device of claim 19, wherein the ballast dims the lamp according to the bit values decoded by the decoding circuit.

21. A method of communicating a data packet having data bits to an apparatus receiving power from an AC power signal on an AC power line, comprising:
 retrieving the data bits from the data packet for communication to the apparatus;
 generating a drive signal that activates a tone generator circuit connected to the AC power line, the drive signal activating the tone generator circuit to produce a tone burst on the AC power signal each time one of the data bits is of a first value and not activating the tone generator circuit each time one of the data bits is of a second value;
 receiving the AC power signal;
 determining the bit values of the data packet according to the presence or absence of tone bursts on the AC power signal.

22. The method of the claim 21 wherein the apparatus comprises a ballast powering a gas discharge lamp.

23. The method of the claim 22, further comprising varying a dimming level of the lamp according to the bit values on the data packet.

24. The method of the claim 21, wherein the drive signal activates the tone generator circuit at a predetermined phase angle of the AC power signal.

* * * * *